United States Patent

Dieter

[15] 3,636,578
[45] Jan. 25, 1972

[54] SPRING COUNTERBALANCED COMPACT DOCKBOARD

[72] Inventor: Donald P. Dieter, Springfield, Tenn.
[73] Assignee: Overhead Door Corporation, Dallas, Tex.
[22] Filed: June 20, 1969
[21] Appl. No.: 834,987

[52] U.S. Cl. .................................................. 14/71
[51] Int. Cl. ............................................. B65g 11/00
[58] Field of Search ........................................ 14/71

[56] References Cited

UNITED STATES PATENTS

| | | | |
|---|---|---|---|
| 3,323,158 | 6/1967 | Loomis | 14/71 |
| 3,327,335 | 6/1967 | Beckwith | 14/71 |
| 3,411,168 | 11/1968 | Hecker | 14/71 |
| 3,460,175 | 8/1969 | Beckwith | 14/71 |
| 3,475,778 | 11/1969 | Merrick | 14/71 |
| 3,500,486 | 3/1970 | Le Clear | 14/71 |

Primary Examiner—Jacob L. Nackenoff
Attorney—Woodhams, Blanchard & Flynn

[57] ABSTRACT

A folding dockboard includes a deck plate hingedly mounted to a loading dock and a lip plate which is hingedly mounted to the deck plate and adapted to be positioned on the bed of a lading carrying vehicle. The lip plate is rotatable from a position in which the lip plate is positioned at a substantial angle to the deck plate to a position in which the deck and lip plates lie in substantially the same plane and counterbalancing springs exert a force on the deck plate in a direction so as to urge the deck plate toward a substantially upright position. A latching assembly rigidly latches the deck and lip plates to each other when the lip plate is positioned in the same plane as the deck plate. The counterbalancing springs maintain the latched deck and lip plates in the substantially upright disposition, but the force exerted by the springs is overcome by the extended lip plate when the latched plates are tilted from their upright disposition, causing movement of the latched plates to a horizontal disposition on the truck bed. The latching assembly may be either manually disengaged to enable storage of the dockboard or automatically disengaged when the truck bed is withdrawn.

11 Claims, 6 Drawing Figures

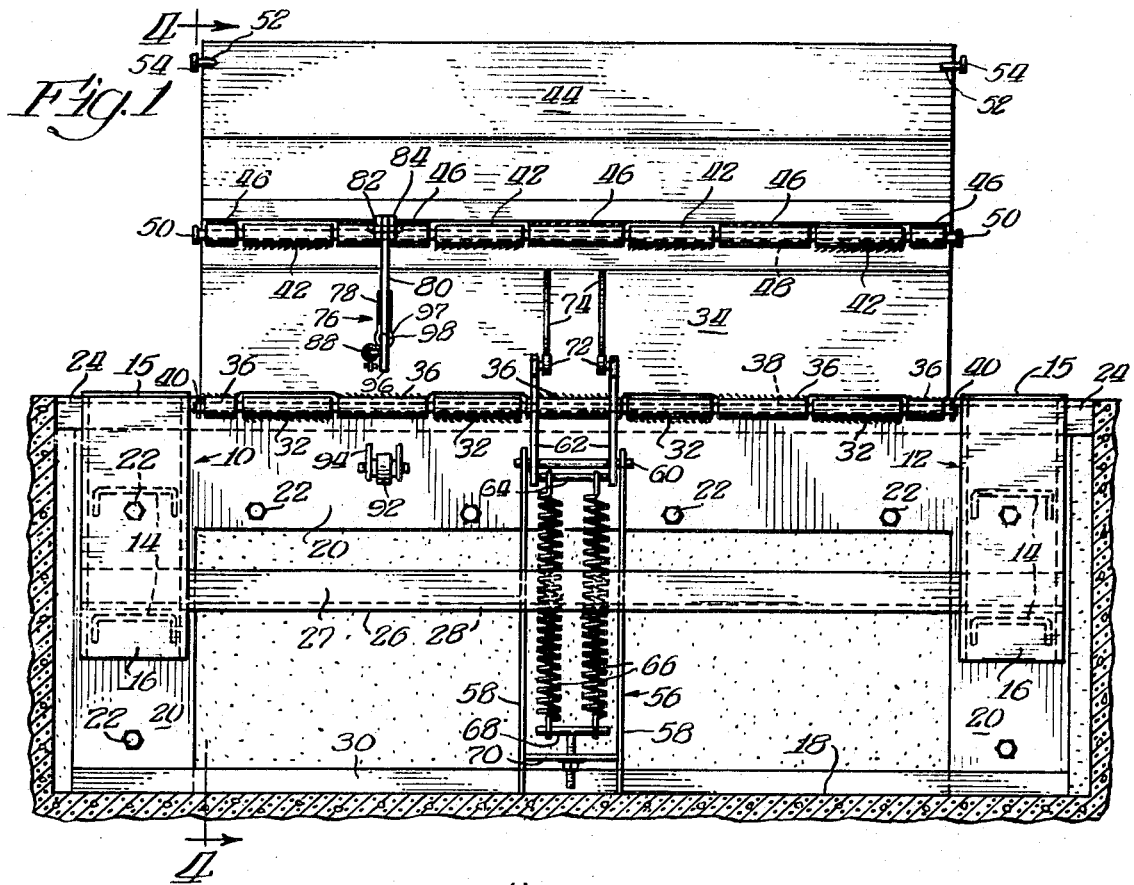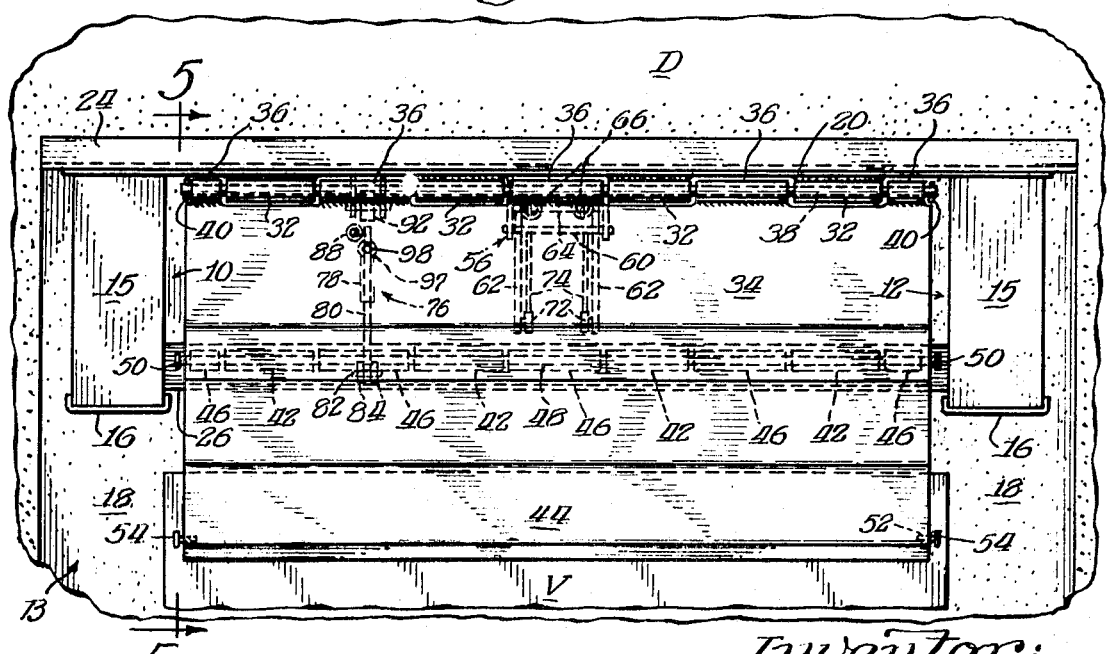

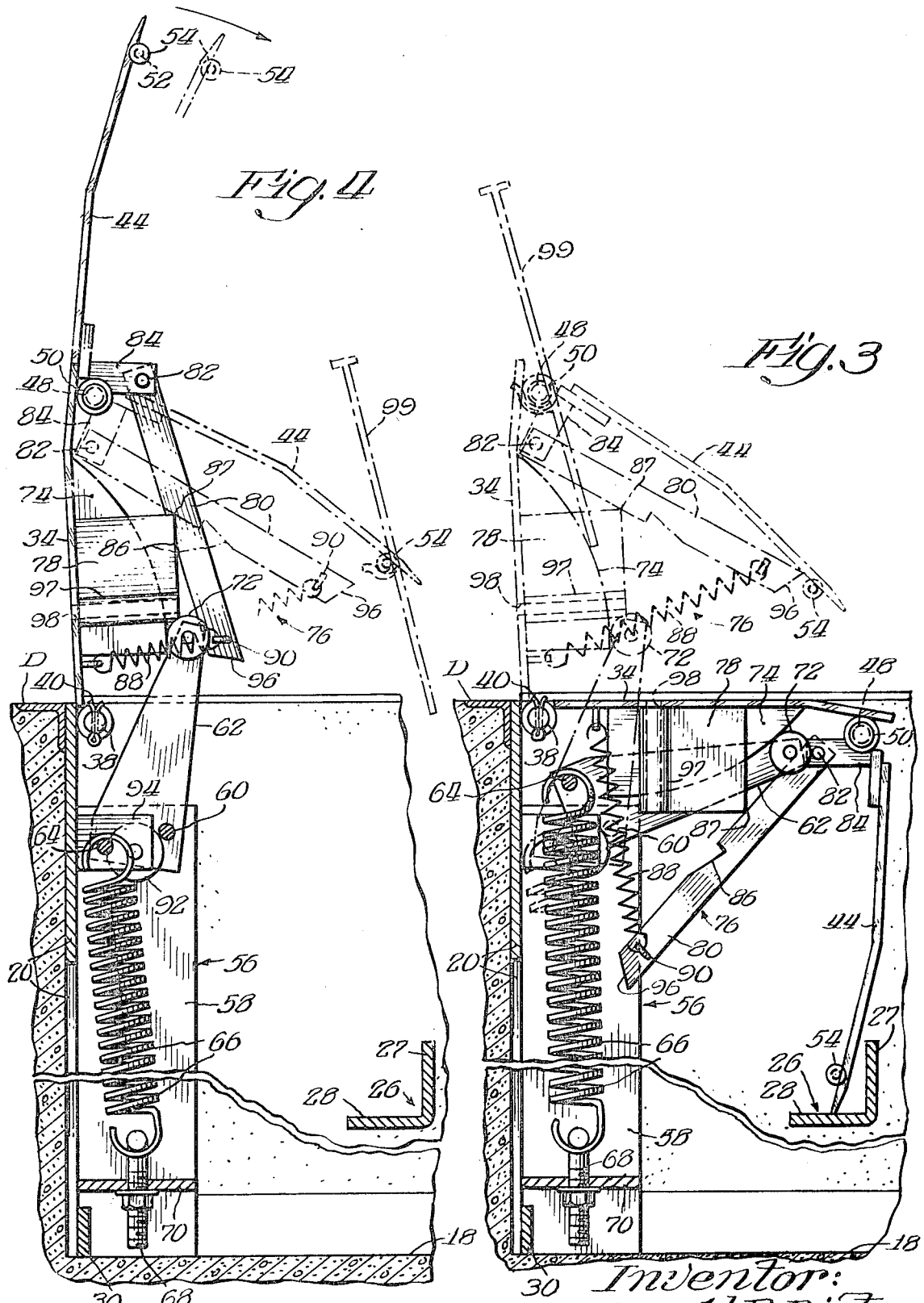

Inventor:
Donald P. Dieter
By
Bair, Freeman & Molinare
Attys

3,636,578

SPRING COUNTERBALANCED COMPACT DOCKBOARD

BACKGROUND OF THE INVENTION

This invention relates to a folding dockboard and, more particularly, to a dockboard for assisting in the transfer of lading between a loading dock and a lading carrying vehicle, the dockboard being counterbalanced so as to effect substantially effortless movement thereof.

In the past, dockboards have been provided which are attached to a loading dock and which are positionable so as to span the void between the loading dock and the bed of a lading vehicle to facilitate the transfer of lading between the dock and the vehicle. Such dockboards are usually moveable between an out-of-the-way position and/or a stored position and the void spanning position. Such movement enables the vehicle to be backed toward the loading dock, but after the vehicle has been positioned the dockboard may be brought to rest on the vehicle bed to span the void between the bed and the dock. Since such dockboards are usually of relatively heavy plate construction in order to support substantial lading loads and lading moving equipment being moved thereacross, a counterbalancing mechanism of some sort is frequently employed to facilitate and assist in the manual movement of the dockboard between the aforesaid positions. However, these counterbalanced dockboard assemblies are frequently quite mechanically complex and still require substantial physical exertion by the person positioning the dockboard, even though the counterbalancing mechanism is provided. The counterbalancing mechanism of the prior dockboards generally acts to pivot the dockboard upwardly toward a substantially upright out-of-the-way position and thereby assists the manual movement of the dockboard to that position. However, when the vehicle bed has been properly positioned and it is desired to move the dockboard downwardly to a substantially horizontal position on the bed, the counterbalancing mechanism resists the latter movement due to the upward force exerted by the mechanism. Consequently in the prior dockboards, the counterbalancing force which assists movement of the dockbooard in one direction must be limited to a certain extent so as not to render positioning of the dockboard in the other direction overly difficult. Thus, substantial counterbalancing assistance is sacrificed in one direction in the interest of relatively facile operation of the dockboard in the other direction.

The dockboard constructed in accordance with the principles of my invention may be easily manually positioned between a number of positions and moved in different directions with substantial equal facility. The dockboard may be easily moved, with a minimum of physical exertion, between a stored position, an upright out-of-the-way position, or a bridging void spanning position between the bed of a lading carrying vehicle and the loading dock. In the dockboard of my invention, a pair of folding plates are hingedly attached to each other and a latching assembly is operable to latch the plates together so as to form a substantially planar surface when the dockboard is moved to its out-of-the-way position or is resting on the bed of the vehicle. The counterbalancing force exerted on the dockboard may be substantially increased without the sacrifice of ease of movement in any direction. The counterbalancing mechanism of my dockboard is effective to balance and maintain the latched plates in their upright out-of-the-way position, yet if the latched plates are tilted slightly from the upright position, the weight and position of the lip plate of the dockboard is effective to override the counterbalancing mechanism to cause movement of the latched plates toward the vehicle bed and firmly maintain the dockboard positioned on the bed of the vehicle. In the dockboard of my invention, the latched plates may be either disengaged manually to enable storage of the dockboard or may be disengaged automatically when the vehicle bed is removed from supporting relationship therebeneath to effect movement of the dockboard toward its stored position. The dockboard of my invention is both simple in construction and may be incorporated into existing dock installations.

SUMMARY OF THE INVENTION

In a principal aspect, the folding dockboard incorporating the principles of my invention includes a deck plate hingedly mounted to a loading dock and a lip plate which is adapted for positioning on the bed of the vehicle and which is hingedly mounted to the deck plate such that the lip plate is rotatable about the deck plate between a first position in which, the deck and lip plates lie in substantially the same plane and a second position in which the plates are positioned at substantial angles to each other. Counterbalancing means are provided which exert a substantially continuous force on the deck plate in a direction so as to urge the deck plate toward an upright position. Latching means rigidly latches the lip and deck plates when the lip plate is positioned in its first position. The continuous force exerted by the counterbalancing means balances and maintains the latched deck and lip plates in the upright position, but is overcome by the torque exerted by the latched lip plate when the latched plates are tilted from the upright position to cause the latched plates to continuously move to a substantially horizontal position toward the truck bed.

These and other objects, features and advantages of the present invention will be more clearly understood when the following detailed description is considered.

BRIEF DESCRIPTION OF THE DRAWINGS

In this description, reference will frequently be made to the attached drawings in which:

FIG. 1 is a front elevation view of a preferred embodiment of folding dockboard constructed in accordance with the principles of my invention and showing the dockboard in the raised upright position so as to expose the dockboard operating mechanism;

FIG. 2 is a plan view of the dockboard shown in FIG. 1, but in which the dockboard has been moved to the horizontal position and rests on the bed of a lading carrying vehicle;

FIG. 3 is a cross-sectioned side elevation view of the dockboard showing the dockboard in the stored position and also showing the dockboard in an intermediate position during repositioning from the stored position toward an upright position;

FIG. 4 is a cross-sectioned side elevation view of the dockboard taken substantially along line 4—4 of FIG. 1 and showing the dockboard being raised from the intermediate position of FIG. 3 to the out-of-the-way upright position;

DESCRIPTION OF THE PREFERRED EMBODIMENT

Figure 5:
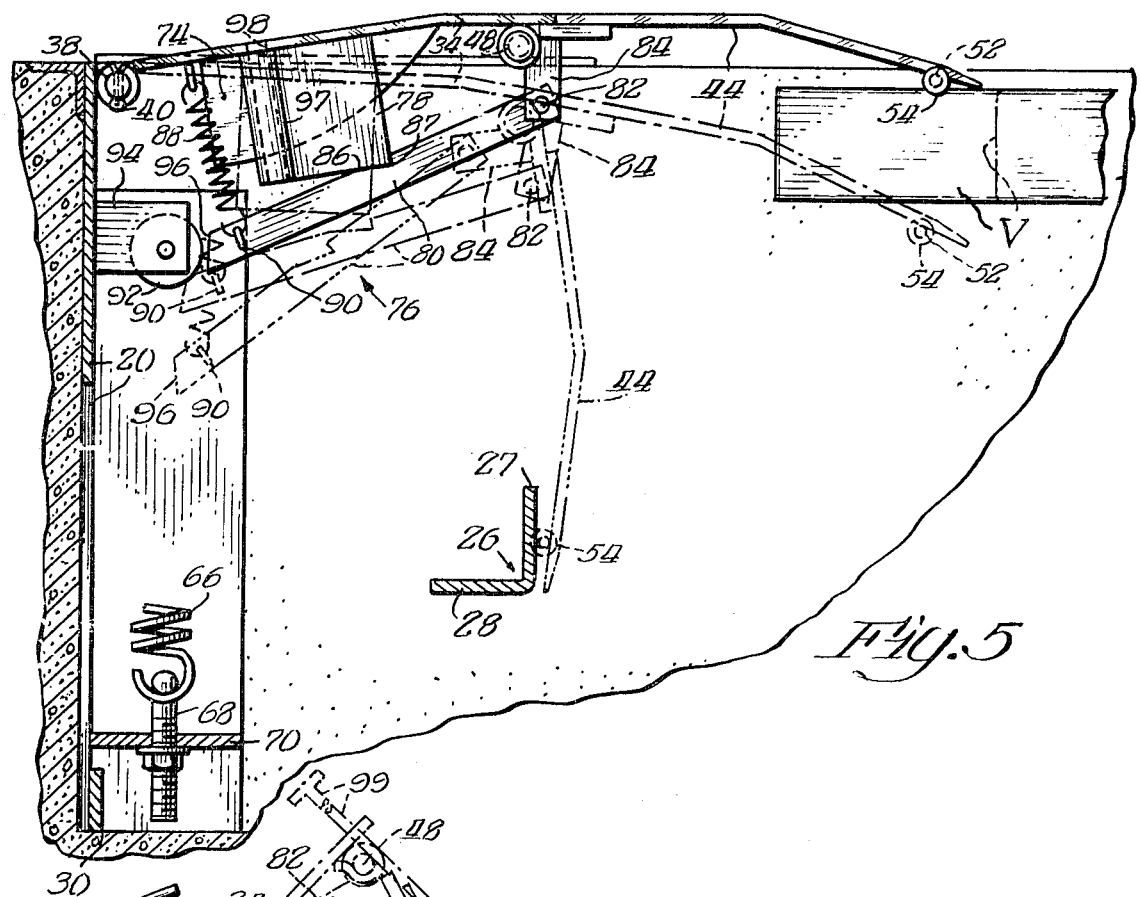
FIG. 5 is a cross-sectioned side elevation view of the dockboard taken substantially along line 5—5 of FIG. 2 and showing the dockboard positioned on the bed of the lading carrying vehicle, the automatic operation of the latching assembly and movement of the dockboard toward the stored position when the truck bed is removed from beneath the dockboard, the counterbalancing mechanism being removed for the purpose of clarity.

With particular reference to FIGS. 1 and 2, a preferred embodiment of dockboard constructed in accordance with the principles of my invention is shown. The dockboard assembly is mounted between a pair of spaced upstanding structural side frames, generally 10 and 12, which are spaced from each other by a distance so as to accommodate the positioning of the dockboard of my invention therebetween. The side frames are positioned within the loading bay B of a conventional loading dock D and include a pair of short heavy horizontal channel members 14 and a short heavy horizontal plate 15 positioned at the dock level and extending outwardly from the dock. A heavy vertical channel 16 is welded to the ends of the plate 15 and the channel members 14 and extends downwardly from substantially the level of the dock D to short of the floor 18 of the bay B. The opposite ends of the channels 14 and plate 15 of each of the side frames 10 and 12 are welded to the outer face of a U-shaped heavy flat anchor plate 20 which, in turn, is firmly secured to the vertical face of the dock D, as by heavy lug screws 22. The edge of the dock D may have a conventional steel angle iron 24 or the like mounted thereon to protect the edge. A storage angle 26, having an upstanding lip portion 27 and a horizontal portion 28, is spaced outwardly from the anchor plate 20 and extends between the side frames 10 and 12 for storage of the dockboard. A reenforcing plate 30 may also be affixed to the vertical legs of the anchor plate 20 for anchoring the bottom of the counterbalancing mechanism, the counterbalancing mechanism to be described in more detail later.

A plurality of tubular hinge elements 32 are securely attached, as by welding, in spaced aligned relationship along the upper longitudinal edge of the anchor plate 20. An elongated relatively heavy rigid, somewhat angled deck plate 34, having a plurality of corresponding hinge elements 36 along one of its longitudinal edges, is positioned such that the hinge elements 36 of the deck plate lie between and are aligned with the hinge elements 32 and a heavy hinge pin 38 is positioned through the hinge elements to hingedly mount the deck plate 34 to plate 20 for pivotal movement thereon. Cotter pins 40 extend through the ends of hinge pin 38 to prevent longitudinal movement of the pin during use.

A plurality of tubular hinge elements 42 are also positioned in spaced and aligned relationship to each other along the other longitudinal edge of deck plate 34 and an elongated rigid, somewhat angled lip plate 44, having a plurality of corresponding tubular hinge elements 46 positioned along one of its longitudinal edges and between the hinge elements 42 of the deck plate, is hingedly mounted to the deck plate for pivotal movement thereabout by a hinge pin 48 which extends through the elements 42 and 46. Each end of hinge pin 48 extends for a short distance beyond the perimeter of the plates 34 and 44 and carries a somewhat enlarged head 50 so as to assure firm seating of a manual operating hook thereon, as will be described in more detail later. Pins 52 are also rigidly attached adjacent the extreme distal corners of the lip plate 44 opposite the hinged edge. The pins extend a short distance beyond the perimeter of the plate and terminate in an enlarged head 54 for the same purpose as previously described with respect to the enlarged heads 50.

A counterbalancing mechanism, generally 56, is provided for urging the deck plate 34 toward the substantially upright position as shown in FIGS. 1, 3 and 4. Referring particularly to FIGS. 1 and 4, the counterbalancing mechanism 56 comprises a pair of spaced vertical plates 58 which are welded at their upper ends to anchor plate 20 and at their lower end to reenforcing plate 30. A pivot pin 60 is journaled between the upper forward corners of the vertical plates 58 and a pair of spaced force arms 62 are pivotally mounted upon the pivot pin so as to rotate about the axis formed by the pivot pin 60. A connecting rod 64 spans the distance between the force arms 62 and maintains the spacing of the arms from each other and the rod is rigidly connected at each end to the force arms in spaced relationship to the pivot axis 60, as shown in FIG. 4. A pair of heavy coil springs 66 are attached at one end to the rod 64 and at the other end to a T-shaped bolt 68 which is firmly anchored to a plate 70 which is welded between the plates 58 adjacent their lower end. The spacing between the rod 64 and the pivot axis 60 provides a force lever arm for counterbalancing the deck plate as will be appreciated upon considering the operation of the deck plate which will be described in more detail later. A pair of rollers 72 are rotatably mounted at the other distal ends of each force arm 62, the rollers facing each other and bearing on the arcuate edge of a pair of arcuate cam plates 74 which are welded to the underside of the deck plate 34.

A latching assembly, generally 76, is provided for latching the plates 34 and 44 into a rigid extension of one another. The assembly includes a shoulder plate 78 which is rigidly attached to and depends downwardly from the underside of the deck plate 34 and an elongated latch bar 80 which is pivotally mounted at one end at 82 to a bracket 84 which is firmly attached to the lip plates 44 adjacent its hinged edge. The latch bar 80 carries a notch 86 intermediate its ends which is arranged to engage a corner 87 of the shoulder plate 78 to latch the lip and deck plates together, as shown in the solid lines of FIG. 4. The latch bar 80 is biased toward its latching position by a coil spring 88 which is attached between a projection 90 extending laterally from the latch bar 80 and the underside of the deck plate 34.

Figure 6:
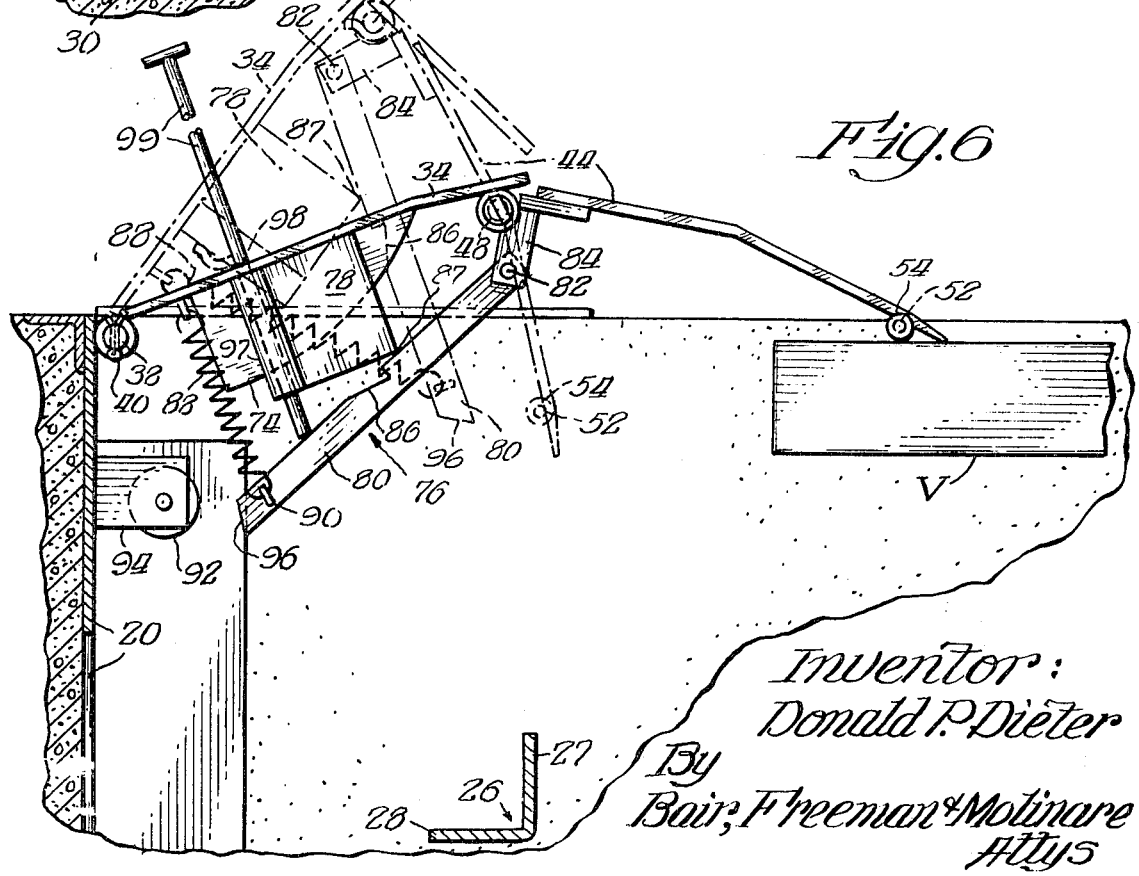
FIG. 6 is a cross-sectioned side elevation view of the dockboard showing the manual unlatching of the latching assembly and repositioning of the dockboard from the position in which it rests on the bed of the lading vehicle to a position preliminary to storage of the dockboard, the counterbalancing mechanism being removed for the purpose of clarity.

Referring particularly to FIGS. 1, 5 and 6, a roller 92 is rotatably mounted upon the horizontal upper portion of the anchor plate 20 on a bracket 94 in a position so as to lie within the path of travel of the end 96 of the latch bar 80 when the deck plate drops below the horizontal position. The roller effects automatic unlatching of the plates to enable movement of the lip plate 44 toward the stored position when the truck bed is removed from supporting relation therebeneath. The automatic unlatching operation of the roller 92 is shown in FIG. 5.

Referring particularly to FIGS. 1, 2 and 6, a guide tube 97 is positioned at the back edge of the latching shoulder 78 in alignment with an aperture 98 opening through the upper face of the deck plate 34 so as to guide the movement of a manual unlatching rod 99 into contact with the upper edge of the latch bar 80 to enable manual override of the spring to unlatch the assembly. Such operation is shown in FIG. 6.

For a clear understanding of the invention, the operation of the dockboard will now be described with particular reference to FIGS. 3 and 4 which show the sequence of movement of the dockboard between the stored position and the balanced upright out-of-the-way latched position, FIG. 5 which shows the automatic sequence of operation of the dockboard toward the stored position when the truck bed is removed from supporting relationship therebeneath, and FIG. 6 which shows the sequence of operation when moving the dockboard from the bed of the vehicle to the stored position.

Referring first to FIG. 3, the dockboard and its latching assembly 76 and counterbalancing mechanism 56 are shown in the stored position as depicted by the solid lines. In such position the deck plate 34 is propped in a substantially horizontally outwardly extending position from the surface of the loading dock D forming an extension of the dock. The lip plate 44 extends perpendicularly downward from the deck plate 34 in the stored position having been rotated about hinge pin 48, the edge of the lip plate resting on the horizontal position 28 of the storage angle 26 to prop the deck plate. In the stored position, the latch bar notch 86 is disengaged from the corner 87 of the shoulder plate 78 as shown in FIG. 3. Also the roller 72 has traveled outwardly along the arcuate edge of the cam 74 such that the force arms 62 extend generally horizontal beneath the deck plate and the rod 64 has been moved upward toward the underside of the deck plate and above the pivot axis 60, drawing a tension on the counterbalancing springs 66. In such position the counterbalancing springs 66 are readied but a counterbalance force sufficient to unseat the lip plate 44 from the storage angle 26 does not obtain due to the downward force exerted by the weight of the lip and deck plates combined with the short moment arm exerted on the force arms 62 about the pivot axis 60, the moment arm being shortened by the positioning of rod 64 above the pivot axis.

When it is desired to position the vehicle bed in the storage bay for the transfer of lading to or from the bed, the dockboard is first removed from its stored position and moved toward the upright out-of-the-way position as shown in FIG. 4. As a first step upon removing the dockboard from its stored position, the manual hook 99 is positioned about one of the extended ends of hinge pin 48 between the plate and the enlarged head 50 and the deck plate 34 is pulled upwardly about hinge pin 38 to the position as shown in the dot and dash lines of FIG. 3. Although the deck plate 34 and the unlatched hanging lip plate 44 are relatively heavy, they are capable of easy manipulation to the position shown in the dot and dash lines. Such ease of movement is due to the fact that when a slight upward force is exerted on the hinge pin 48 to commence the counterclockwise rotation of the deck plate, the force arms 62 also rotate upwardly, increasing the horizontal distance between rod 64 and pivot axis 60 which, in turn, increases the moment arm through which the tensioned counterbalancing springs exert a counterclockwise torque on the force arms 62. Since the torque progressively increases as the force arms 62 continue to rotate, the increasing torque renders movement of the heavy plates toward the dot and dash position in FIG. 3 progressively easier due to the increasing force exerted by the rollers 72 upon the arcuate edges of the cams 74 as the plates move upwardly. The rollers 72 ride along the arcuate edge surface of the cams, and after the deck plate 34 has been positioned in its upright position, as shown in FIG. 3, the force arms 62 are positioned substantially vertical as shown in the dot and dash lines of FIG. 3.

The latching bar notch 86 still remains disengaged from the shoulder plate 78, as shown in FIGS. 3 and 4, since the lip plate 44 remains at substantially the same angle to the deck plate 34 that it was in its stored position, the angle being maintained by engagement of the bracket 84 with the underside of the deck plate 34 as the deck plate is rotated upwardly. It is preferable that the lip plate be maintained in such substantially angular position rather than swinging considerably closer to the deck plate upon raising the latter to minimize the arc through which the lip plate must be swung in the next step which will now be described.

Referring to FIG. 4, the manual hook 99 is removed from the hinge pin 48 and is repositioned about one of the pins 52 and the lip plate 44 is swung upwardly about hinge pin 48 from the dot and dash line position, shown in FIGS. 3 and 4, to the solid line position shown in FIG. 4, forming a continuous extension of the deck plate. Upon counterclockwise upward rotation of the lip plate, as viewed in FIG. 4, the bracket 84 also rotates in a counterclockwise direction from the dot and dash line position to the solid line position, since the bracket is rigidly attached to the underside of the lip plate.

Rotation of the lip plate 44 and bracket 84 to the solid line position lifts the latch bar 80 upwardly until the notch 86 is in alignment with the corner 87 of the shoulder plate 78. When the notch and shoulder plate corner are aligned, the force exerted by spring 88 automatically urges the notch into latching engagement with the shoulder to latch the lip and deck plates together in the extended position shown in the solid lines in FIG. 4. When the latched plates are positioned in the upright position as shown in FIG. 4, the combined weight of the latched plates is directed substantially downwardly through the hinge axis formed by hinge pin 38 and this direction, combined with the force exerted to the left by the rollers 72, force arms 62 and springs 66, balance and maintain the latched plates in the upright position.

When the vehicle bed V has been positioned and it is desired to move the dockboard to the void bridging horizontal position as shown in the solid lines of FIG. 5, the latched plates need only be tilted slightly from their upright position in the direction of the arrow in FIG. 4. The lip plate 44, which is selected to be of substantial size and weight and which is locked in position in a substantially outwardly extending relationship from the deck plate 34, will exert a progressive, rapidly increasing downward clockwise torque about the pivot axis formed by hinge pin 38 when the latched plates are tilted. Although a substantial upwardly directed counterbalance force is still exerted through the force arms 62, the increased torque provided by the extended lip plate is sufficient to readily override the counterbalance force and downward movement of the latched plates will continue until the latched plates rest upon the vehicle bed V as shown in FIG. 5 in the solid lines. It will be appreciated that the weight of the lip plate, combined with the moment arm through which it acts, is quite ample to hold the dockboard down upon the bed V even in the presence of the continuous upward force exerted by the force arms 62, so as to prevent bouncing of the dockboard during the transfer of lading thereacross.

It will be seen that by utilizing the position and weight of the latched lip plate 44 to move the dockboard from the upright to the horizontal position, the counterbalancing force may be substantially increased without sacrificing ease of movement between the latter mentioned positions.

Referring to FIG. 5, the dockboard is shown in the operation of being automatically restored toward its stored position when the vehicle bed V is removed from beneath the dockboard after the transfer of lading has been completed. To effect such movement, the bed is removed to the dot and dash line position as shown in FIG. 5, removing the support from beneath the latched lip and deck plates. Since the plates are no longer supported in their horizontal position as shown in the solid lines in FIG. 5, they drop slightly to the dot and dash line position. Upon such movement, the end 96 of the latch bar 80 will approach and contact the roller 92 and ride downwardly thereon from the solid line position to the dot and dash line position, effecting disengagement of the latch bar notch 86 from the corner 87 of the shoulder plate 78 and overriding spring 88 to unlatch the latching assembly. Excessive downward movement of the deck plate beneath the horizontal is prevented by the upward force exerted by the counterbalancing mechanism 56 through rollers 72 which act to provide a support for supporting the deck plate 34 in the dot and dash line position shown in FIG. 5, particularly after the plates have been unlatched and the lip plate has swung downwardly toward the dashed line position to substantially decrease the counterclockwise torque about hinge plate 38. Since the latching assembly 76 no longer acts to firmly latch the lip plate 44 in its extended relationship to the deck plate 34, the lip plate swings downwardly about hinge pin 48 and assumes the position shown in the dashed lines in FIG. 5. If desired, the lip plate 44 may be restored to its stored position merely by lifting the extended end of the hinge pin 48 slightly with the manual hook 99 in order to lift the lower edge of the lip plate over the upstanding lip 27 of the storage angle 26, such that the edge comes to rest on the angle as shown in FIG. 3.

It should be noted that the latched deck and lip plates may be moved up or down somewhat from the solid line position shown in FIG. 5 to accommodate vehicle beds of varied height and to compensate for change in the bed height due to loading or unloading. For this reason the end 96 of the latch bar 80 is spaced somewhat from roller 92 to allow for such height variation without causing premature contact with the roller and unlatching of the latching assembly 76.

Referring to FIG. 6, the operation of the dockboard is shown where it is desired to restore the dockboard to its stored position from the position in which it rests on the bed V of the lading vehicle without removing the bed from beneath the dockboard. To effect such operation, the latch bar 80 must be unlatched from the shoulder plate 78. This is easily effected by inserting the projecting end of the manual hook 99 through aperture 98 in the upper face of the deck plate 34, through the guide tube 97 and into engagement with the latch bar 80. When the rod 99 is pushed to overcome the force exerted by the spring 88, the notch 86 disengages the shoulder plate corner 87. Upon unlatching the plates, the clockwise torque normally exerted by the latched lip plate is substantially reduced. The upward force exerted on the deck plate 34 by the counterbalancing mechanism 56 is then sufficient to push the deck plate upwardly to the solid line position shown in FIG. 6, causing the dockboard to buckle and the notch 86 to move out of alignment with the corner 87 of the shoulder plate 78. Once the plates have buckled, the manual operating hook 99 is removed from the guide tube 97 and is hooked about one of the extended ends of hinge pin 48, to lift the deck plate to the dot and dash line position shown in FIG. 6. Since the lip plate 44 has been unlatched from the deck plate, the lip plate will swing about hinge pin 48 as shown in FIG. 6 and the deck and lip plates may be lowered into the stored position in storage angle 26 as shown in the solid lines in FIG. 3.

It is to be understood that the embodiment of the invention which has been described is merely illustrative of an application of the principles of the invention. Numerous modifications may be made by those skilled in the art without departing from the true spirit and scope of the invention.

What is claimed is:

1. A folding dockboard for transferring lading between a loading dock and a lading carrying vehicle, comprising:

swingable deck means for transferring lading between the loading dock and the vehicle, the deck means including a deck plate adapted to have one edge thereof hingedly mounted to the loading dock and the vehicle, the deck means including a deck plate adapted to have one edge thereof hingedly mounted to the loading dock, the deck means also including a lip plate adapted to be positioned on the bed of the vehicle, the lip plate being hingedly connected to said deck plate adjacent the other edge thereof and being angularly swingable relative to the deck plate between a first position in which the deck and lip plates lie in substantially the same plane and a second position in which the deck and lip plates are positioned at a substantial angle relative to one another, said deck means being angularly movable relative to said loading dock between a substantially upright storage position and a substantially horizontal use position;

counterbalancing means for continuously exerting a substantial force on said deck plate for urging the deck plate toward said upright position, said counterbalancing means including:

a. cam means mounted on said deck plate adjacent the lower surface thereof, b. lever means adapted to be pivotally mounted on said loading dock for swinging movement in a substantially vertical plane about a pivot axis, c. said lever means including follower means thereon disposed in engagement with said cam means, said follower means being spaced a substantial distance from said pivot axis, and d. movable force exerting means interconnected between said dock and said lever means for applying a substantially vertically directed force on said lever means irrespective of the position of said deck means, said vertically directed force being applied to said lever means at a point which is horizontally laterally spaced from both said pivot axis and said follower means for swingably urging said lever means in a direction whereby said follower means is maintained in engagement with said cam means, e. said counterbalancing means exerting sufficient force on said deck plate so as to maintain said deck means in said storage position, said deck means having sufficient weight and creating sufficient torque when said lip plate is in said first position to overcome the force created by said counterbalancing means after said deck means has been tilted slightly from said storage position, whereupon the weight of the deck means causes the aligned deck and lip plates to continuously move downwardly into said horizontal use position; and latch means for rigidly latching said lip plate to said deck plate in said first position.

2. A dockboard according to claim 1, wherein said latch means includes a latch lever pivotally mounted on one of said deck and lip plates adjacent the underside thereof, and a latch member fixedly mounted on the other of said deck and lip plates and positioned for latching engagement with said latch lever when said lip plate is in said first position.

3. A dockboard according to claim 2, further including means for causing said latch lever to automatically engage said latch member when said lip plate is in said first position.

4. A dockboard according to claim 3, wherein said last-mentioned means includes spring means for resiliently urging said latch lever in a pivotal direction whereby same is pivotally moved so as to automatically engage said latch member when said lip plate is in said first position.

5. A dockboard according to claim 1, wherein said force-exerting means comprises substantially vertically oriented spring means disposed for exerting a substantially vertical force on said lever means in all positions of said deck means, said spring means having one end thereof connected to said lever means at a location which is horizontally laterally spaced from said pivotal axis by a distance less than the spacing between said follower means and said pivot axis.

6. A dockboard according to claim 5, wherein said spring means comprises a vertically disposed compression spring having the upper end thereof interconnected to said lever means, the lower end of said compression spring being fixedly interconnected relative to said loading dock.

7. A dockboard according to claim 5, wherein said latch means includes a latch lever pivotally mounted to one of said deck and lip plates and a latch member fixedly secured to the other of said deck and lip plates and disposed for latching engagement with said latch lever when said lip plate is in said first position, said latch means also including means for causing said latch lever to automatically engage said latch member when said lip plate is moved into said first position.

8. A dockboard according to claim 1, wherein said force-exerting means comprises spring means disposed in a substantially vertical position irrespective of the position of said deck means for continuously imposing a substantially vertically directed force on said lever means, said lever means comprising a lever member having one end thereof connected to said spring means, said follower means including a cam roller rotatably mounted on said lever means adjacent the other end thereof, and said lever member being pivotally mounted on said loading dock about a pivot axis located between and horizontally laterally spaced from a line joining the axis of said cam roller to the point of connection of said spring means.

9. A folding dockboard for transferring lading between a loading dock and a lading carrying vehicle, comprising:

swingable deck means for transferring lading between the loading dock and the vehicle, the deck means including a deck plate adapted to have one edge thereof hingedly mounted to the loading dock, the deck means also including a lip plate adapted to be positioned on the bed of the vehicle, the lip plate being hingedly connected to said deck plate adjacent the other edge thereof and being angularly swingable relative to the deck plate between a first position in which the deck and lip plates lie in substantially the same plane and a second position in which the deck and lip plates are positioned at a substantial angle relative to one another, said deck means being angularly movable relative to said loading dock between a substantially upright storage position and a substantially horizontal use position;

counterbalancing means for continuously exerting a substantial force on said deck plate for urging the deck plate toward said upright position, said counterbalancing means including:

a. cam means mounted on said deck plate adjacent the lower surface thereof, b. lever means adapted to be pivotally mounted on said loading dock for swinging movement in a substantially vertical plane about a pivot axis, c. said lever means including follower means thereon disposed in engagement with said cam means, said follower means being spaced a substantial distance from said pivot axis, and d. movable force-exerting means interconnected to said lever means for applying a torque thereto for swingably urging said lever means in a direction whereby said follower means is maintained in engagement with said cam means, said force-exerting means applying a force to said lever means at a point which is laterally spaced from both said pivot axis and said follower means, e. said counterbalancing means exerting sufficient force on said deck plate so as to maintain said deck means in said storage position, said deck means having sufficient weight and creating sufficient torque when said lip plate is in said first position to overcome the force created by said counterbalancing means after said deck means has been tilted slightly from said storage position, whereupon the weight of the deck means causes the aligned deck and lip plates to continuously move downwardly into said horizontal use position;

latch means for rigidly latching said lip plate to said deck plate in said first position, said latch means including a latch lever pivotally mounted on said lip plate adjacent the underside thereof and a latch member fixedly mounted on the underside of said deck plate and positioned for latching engagement with said latch lever when said lip plate is in said first position; and means for causing said latch lever to automatically engage said latch member when said lip plate is in said first position, said last-mentioned means including spring means resiliently urging said latch lever in a pivotal direction whereby said latch lever is pivotally moved so as to automatically engage said latch member when said lip plate is in said first position.

10. A dockboard according to claim 9, further including means for automatically unlatching said latch means to permit said lip plate to swing downwardly from said first position to said second position when the deck means is in the horizontal use position and the vehicle bed is withdrawn from beneath the lip plate.

11. A dockboard according to claim 10, wherein said unlatching means includes abutment means mounted on said loading dock and disposed for contacting and causing disengagement of said latch lever from said latch member when the deck means swings downwardly a predetermined amount below the use position.

* * * * *